(12) United States Patent
Harder et al.

(10) Patent No.: US 12,270,440 B1
(45) Date of Patent: Apr. 8, 2025

(54) ACCESSORY GEARBOX ENGINE DECOUPLING MECHANISM

(71) Applicant: The Boeing Company, Arlington, VA (US)

(72) Inventors: Todd T. Harder, West Chester, PA (US); Yiyi Zhang, Wallingford, PA (US); Mark Joseph Robuck, Chadds Ford, PA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/416,754

(22) Filed: Jan. 18, 2024

(51) Int. Cl.
| | | |
|---|---|---|
| *F16D 11/10* | (2006.01) | |
| *B64D 41/00* | (2006.01) | |
| *F16D 48/00* | (2006.01) | |
| *F16H 25/20* | (2006.01) | |
| *F16D 11/00* | (2006.01) | |

(52) U.S. Cl.
CPC .............. *F16D 11/10* (2013.01); *B64D 41/00* (2013.01); *F16D 48/00* (2013.01); *F16H 25/20* (2013.01); *F16D 2011/004* (2013.01); *F16H 2025/209* (2013.01)

(58) Field of Classification Search
CPC ............... F16H 2200/004; F16H 25/22; F16H 25/2204; F16H 2025/209; F16D 11/04–16; F16D 2011/004; F16D 2011/002
See application file for complete search history.

(56) References Cited

U.S. PATENT DOCUMENTS

| | | | | |
|---|---|---|---|---|
| 3,178,958 | A  * | 4/1965 | Beck | F16H 25/2204 |
| | | | | 74/424.83 |
| 8,667,858 | B2 * | 3/2014 | Fuechsel | F16C 35/045 |
| | | | | 384/535 |
| 11,407,441 | B2 * | 8/2022 | Hafermalz | F16H 57/039 |
| 2010/0012453 | A1 * | 1/2010 | Hiraiwa | F16D 23/06 |
| | | | | 192/53.341 |
| 2014/0352468 | A1 * | 12/2014 | Kim | B62D 5/0409 |
| | | | | 74/409 |
| 2016/0097430 | A1 * | 4/2016 | Imafuku | F16D 13/54 |
| | | | | 192/18 B |
| 2019/0140474 | A1 * | 5/2019 | Stoltz | B60K 25/00 |
| 2021/0122239 | A1 * | 4/2021 | Fujii | B60K 6/52 |

* cited by examiner

*Primary Examiner* — Ernesto A Suarez
*Assistant Examiner* — Lillian T Nguyen
(74) *Attorney, Agent, or Firm* — Yee & Associates, P.C.

(57) ABSTRACT

A gearbox decoupling apparatus and method for powering an accessory system. The gearbox decoupling apparatus employs a worm gear mechanism having an input worm pinion engaged with a worm gear wheel. A threaded rod is engaged with the worm gear wheel. A decoupling adapter is connected to the threaded rod. Rotation of the input worm pinion imparts movement of the decoupling adapter between a first position and a second position. When the decoupling adapter is in the first position, the decoupling adapter is mechanically engaged with a power take-off gear and a power take-off adapter. When the decoupling adapter is in the second position, the decoupling adapter is mechanically engaged with the power take-off gear and disengaged from the power take-off adapter thus allowing an accessory system to be powered by an alternate power source other than a main power source that is permanently connected to the power take adapter.

20 Claims, 6 Drawing Sheets

ACCESSORY GEARBOX ENGINE DECOUPLING MECHANISM

GOVERNMENT LICENSING RIGHTS

This invention was made with Government support under Contract Number N00019-18-C-1012, awarded by the Department of Defense. The government has certain rights to this invention.

BACKGROUND INFORMATION

1. Field

The present disclosure relates generally to operation of aircraft accessory systems. More specifically, the present disclosure relates to a gearbox decoupling mechanism for operating and testing aircraft accessory systems without employing aircraft main engines.

2. Background

Fixed wing aircraft have many accessory systems (for example, heating and cooling systems and lighting systems) requiring numerous generators, hydraulic pumps, etc. that need a power source to operate. During flight, the aircraft main engines provide the power for the accessory systems. When the aircraft is not in flight, the accessory systems often still need to operate for the comfort of passengers and crew and for maintenance and testing of the accessory systems.

Typically, the power source to operate the accessory systems of the aircraft, even when the aircraft is not in flight, is the aircraft main engines. Operating the main aircraft engines while the aircraft is not in flight, for example, stationary on the tarmac or in a maintenance hangar, presents risks and challenges. Caution must be taken when human operators are in proximity of running aircraft engines. Running the aircraft engines creates unwanted noise, burns fuel, and prematurely wears engine components.

Therefore, it would be desirable to have a method and apparatus that takes into account at least some of the issues discussed above, as well as other possible issues.

SUMMARY

An illustrative example of the present disclosure provides a gearbox decoupling apparatus which includes a worm gear mechanism, a threaded rod, and a decoupling adapter. The threaded rod is threadedly engaged with the worm gear mechanism. The decoupling adapter is connected to the threaded rod. The decoupling adapter has a first position and a second position. When the decoupling adapter is in the first position, the decoupling adapter is mechanically engaged with a power take-off gear and a power take-off adapter. When the decoupling adapter is in the second position, the decoupling adapter is mechanically engaged with the power take-off gear and disengaged from the power take-off adapter.

Another illustrative example of the present disclosure provides a system for decoupling an accessory gearbox of an engine which includes a worm gear mechanism, a threaded rod, a decoupling adapter, a power take-off gear, and a power take-off adapter. The threaded rod is engaged with the worm gear mechanism. The decoupling adapter is connected to the threaded rod. The decoupling adapter is movable between a first position and a second position. The power take-off gear is engaged with the decoupling adapter. The power take-off gear is also mechanically connected to an accessory system and an external power source. The power take-off adapter is mechanically connected to an engine. Movement of the decoupling adapter between the first and second positions allows for the accessory system to be powered by the external power source without use of the engine.

A further illustrative example of the present disclosure provides a method for powering an accessory system. A worm gear mechanism is connected to a decoupling adapter. An external power source is connected to a power take-off gear. The power take-off gear being permanently engaged with the decoupling adapter. The worm gear mechanism is activated such that the decoupling adapter moves between a first position and a second position. When the decoupling adapter is in the first position, the decoupling adapter is mechanically engaged with the accessory system and an engine. When the decoupling adapter is in the second position, the decoupling adapter is mechanically engaged with the accessory system and disengaged from the engine such that the accessory system is powered by the external power source without using the engine.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The illustrative examples recognize and take into account one or more different considerations. For example, the illustrative examples recognize and take into account that aircraft subsystems or accessory systems are typically powered by the main aircraft engines.

The illustrative examples also recognize and take into account that in order to start the main aircraft engines, the main aircraft engines are connected to a ground cart which provides the power and movement to start the main aircraft engines.

The illustrative examples also recognize and take into account that the main aircraft engines are often run while the aircraft is on the ground in order to power the accessory systems for the comfort of the passengers and crew, maintenance functions, or testing.

The illustrative examples also recognize and take into account that running the main aircraft engines while the aircraft is on the ground just to power the accessory systems is a safety hazard, burns fuel, creates unwanted noise, and prematurely wears engine components.

Thus, the illustrative examples provide a gearbox decoupling apparatus and system for powering an accessory system such that the accessory system is powered by an external power source without using the aircraft main engines while still allowing for the external power source to also be used to start the aircraft main engines.

Figure 1:
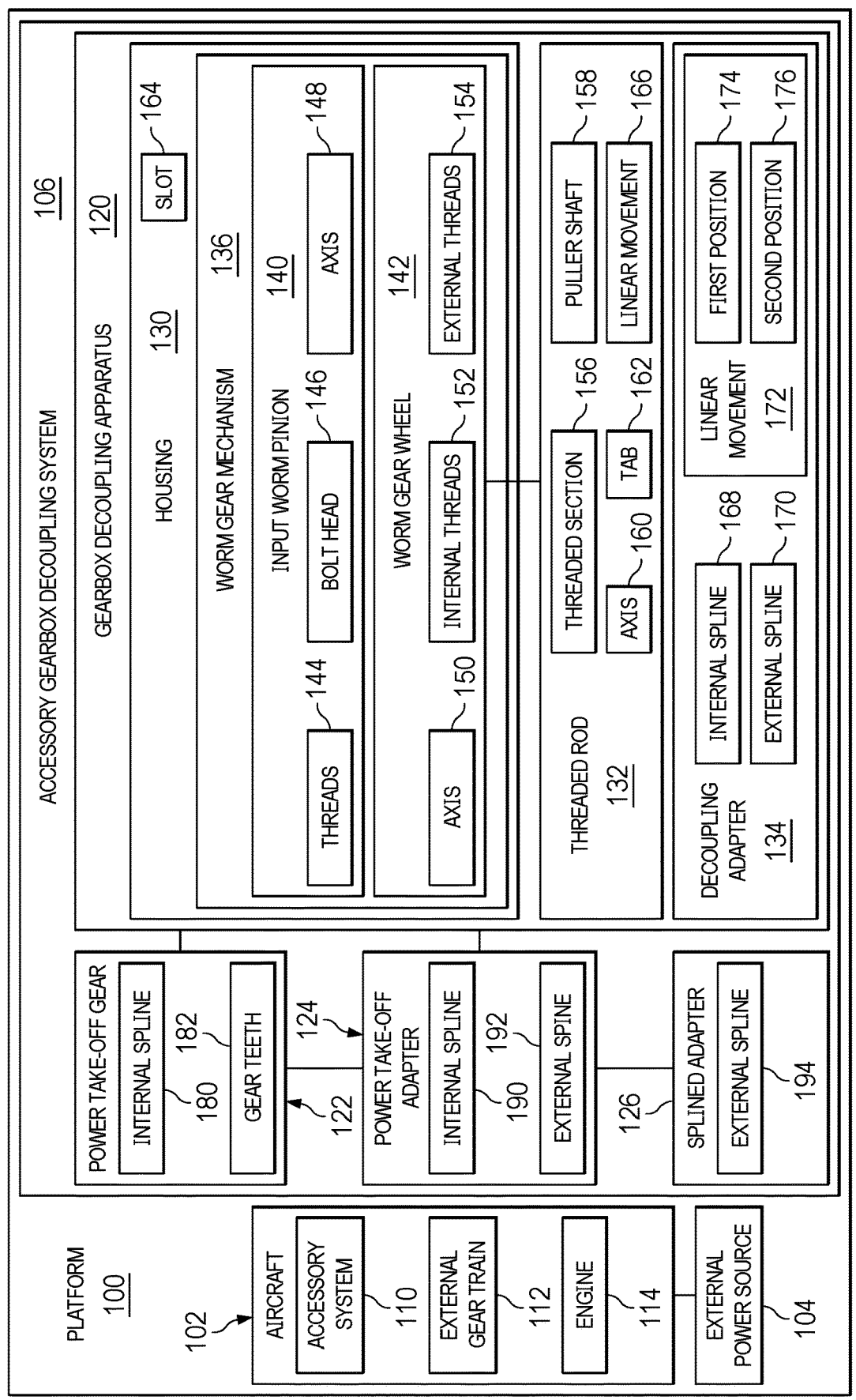
FIG. 1 is an illustration of a block diagram of a platform in accordance with an illustrative example.

With reference now to the figures and, in particular, with reference to FIG. 1, an illustration of a block diagram of a platform is depicted in accordance with an illustrative example. Platform 100 has aircraft 102, external power source 104, and accessory gearbox decoupling system 106 in this illustrative example.

Platform 100 may take a variety of different forms. For example, without limitation, platform 100 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where gearbox decoupling is desirable.

In this illustrative example, platform 100 takes the form of aircraft 102. In this illustrative example, when platform 100 takes the form of aircraft 102, aircraft 102 includes accessory system 110, external gear train 112, and engine 114.

Accessory system 110, for example, may include heating and cooling systems and lighting systems that require generators, hydraulic pumps, etc., which all need a power source to operate. In this illustrated example, external gear train 112 is mechanically connected to accessory system 110. In this illustrated example, accessory gearbox decoupling system 106 makes it possible to connect both engine 114 of aircraft 102 and/or external power source 104 to external gear train 112 and thus accessory system 110. Accessory gearbox decoupling system 106 provides the capability to disengage engine 114 from accessory system 110 while maintaining a connection of accessory system 110 to external power source 104. Accessory gearbox decoupling system 106 allows power to be provided to accessory system 110 from external power source 104 without the use of engine 114. External power source 104, for example may include a standard ground cart commonly used at airports for providing necessary power to start aircraft engines. Accessory gearbox decoupling system 106 allows external power source 104 to power accessory system 110 while aircraft 102 is parked on the ground surface while also providing a connection between engine 114 and external power source 104 in order to start engine 114 when aircraft 102 is ready for take-off.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

Accessory gearbox decoupling system 106 includes gearbox decoupling apparatus 120, power take-off gear 122, power take-off adapter 124 and splined adapter 126.

Power take-off gear 122 is mechanically engaged with external gear train 112. As a result, power take-off gear 122 is mechanically engaged with external power source 104 via external gear train 112.

Gearbox decoupling apparatus 120 includes housing 130, threaded rod 132, and decoupling adapter 134.

Worm gear mechanism 136 is mounted within housing 130. Housing 130 is mounted within aircraft 102, for example, within a wing section or fuselage section of aircraft 102. Worm gear mechanism 136 includes input worm pinion 140 and worm gear wheel 142. Input worm pinion 140 is generally cylindrical shaped and includes threads 144 winding around the cylindrical exterior. Input worm pinion 140 is threadedly engaged with housing 130. Input worm pinion 140 further includes bolt head 146. Bolt head 146 is shaped to engage a torque producing implement to provide rotational movement of input worm pinion 140 about central longitudinal axis 148. Worm gear wheel 142 is generally disc shaped with a central hole about axis 150 and includes internal threads 152 in the central hole and external threads 154 about the perimeter of the disc shape.

Threads 144 of input worm pinion 140 are sized to engage external threads 154 of worm gear wheel 142. As is typical for a worm gear setup, rotation of input worm pinion 140 about axis 148 causes rotation of worm gear wheel 142 about axis 150.

Threaded rod 132 includes threaded section 156 connected to puller shaft 158. Threaded rod 132 is generally cylindrical shaped having central longitudinal axis 160. Axis 160 is co-linear with axis 150 of worm gear wheel 142. Threaded section 156 is threadedly engaged with internal threads 152 of worm gear wheel 142. Threaded rod 132 includes tab 162. Tab 162 is sized and shaped to slidingly engage slot 164 formed in housing 130. As a result, rotation of input worm pinion 140 about axis 148 causes rotation of worm gear wheel 142 about axis 150 which in turn causes linear movement 166 of threaded rod 132 along axis 160 while tab 162 engaged with slot 164 prevents rotation of threaded rod 132 about axis 160.

Decoupling adapter 134 is generally a hollow cylinder. Decoupling adapter 134 includes internal spline 168 and external spline 170. Decoupling adapter 134 is connected to puller shaft 158. Thus, linear movement 166 of threaded rod 132 causes linear movement 172 of decoupling adapter 134. Linear movement 172 of decoupling adapter 134 is between first position 174 and second position 176. As a result, rotation of input worm pinion 140 about axis 148 ultimately affects linear movement 172 of decoupling adapter 134 between first position 174 and second position 176.

Power take-off gear 122 includes internal spline 180 and gear teeth 182. Power take-off gear 122 is permanently engaged with decoupling adapter 134. External spline 170 of decoupling adapter 134 is permanently engaged with internal spline 180 of power take-off gear 122. Decoupling adapter 134 can move linearly 172 with respect to power take-off gear 122. Whether decoupling adapter 134 is in first position 174 or second position 176, decoupling adapter 134 is engaged with power take-off gear 122. Power take-off gear 122 mechanically engages external gear train 112 via gear teeth 182.

Power take-off adapter 124 includes internal spline 190 and external spline 192. External spline 192 is engageable with internal spline 168 of decoupling adapter 134. Power take-off adapter 124 is permanently engaged with splined adapter 126 via internal spline 190 and external spline 194 of splined adapter 126. Splined adapter 126 is connected to engine 114.

When decoupling adapter 134 is in first position 174, internal spline 168 of decoupling adapter 134 is engaged with external spline 192 of power take-off adapter 124. When decoupling adapter 134 is in second position 176, internal spline 168 of decoupling adapter 134 is disengaged from external spline 192 of power take-off adapter 124.

As a result, when decoupling adapter 134 is in first position 174, decoupling adapter 134 is mechanically engaged with power take-off gear 122 and power take-off adapter 124. When decoupling adapter 134 is in second position 176, decoupling adapter 134 is mechanically engaged with power take-off gear 122 and mechanically disengaged from power take-off adapter 124 such that external spline 192 of power take-off adapter 124 is not engaged with internal spline 168 of decoupling adapter 134.

Thus, the illustrative examples provide accessory gearbox decoupling system 106 for powering accessory system 110 with external power source 104 without using engine 114 while still allowing for external power source 104 to also be used to start engine 114 by merely providing torque to input worm pinion 140. In non-limiting examples, torque can be provided to input worm pinion 140 manually or by a power source such as external power source 104.

Figure 2:
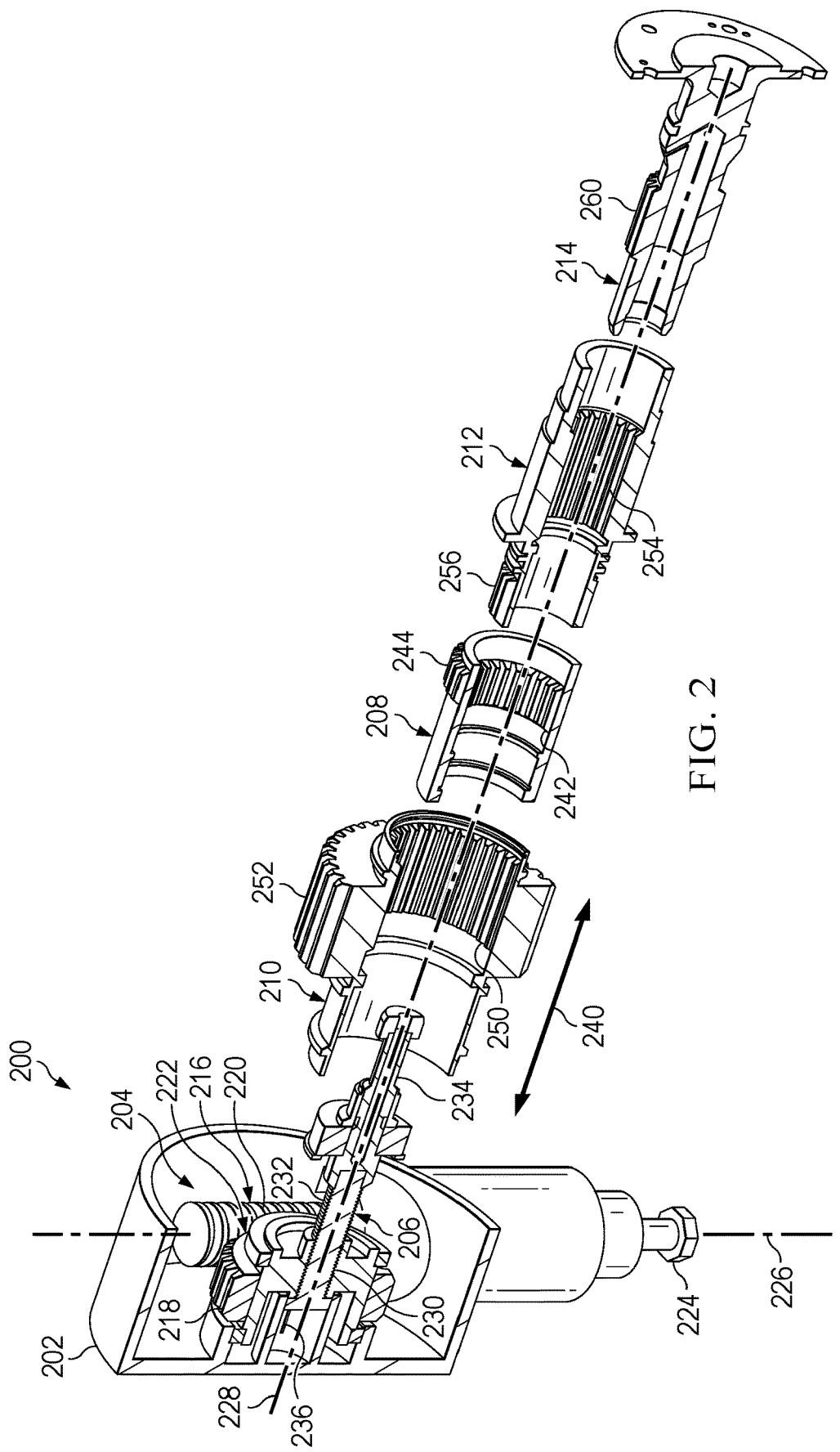
FIG. 2 is an illustration of an exploded sectional view of a gearbox decoupling apparatus in accordance with an illustrative example.
Figure 3:
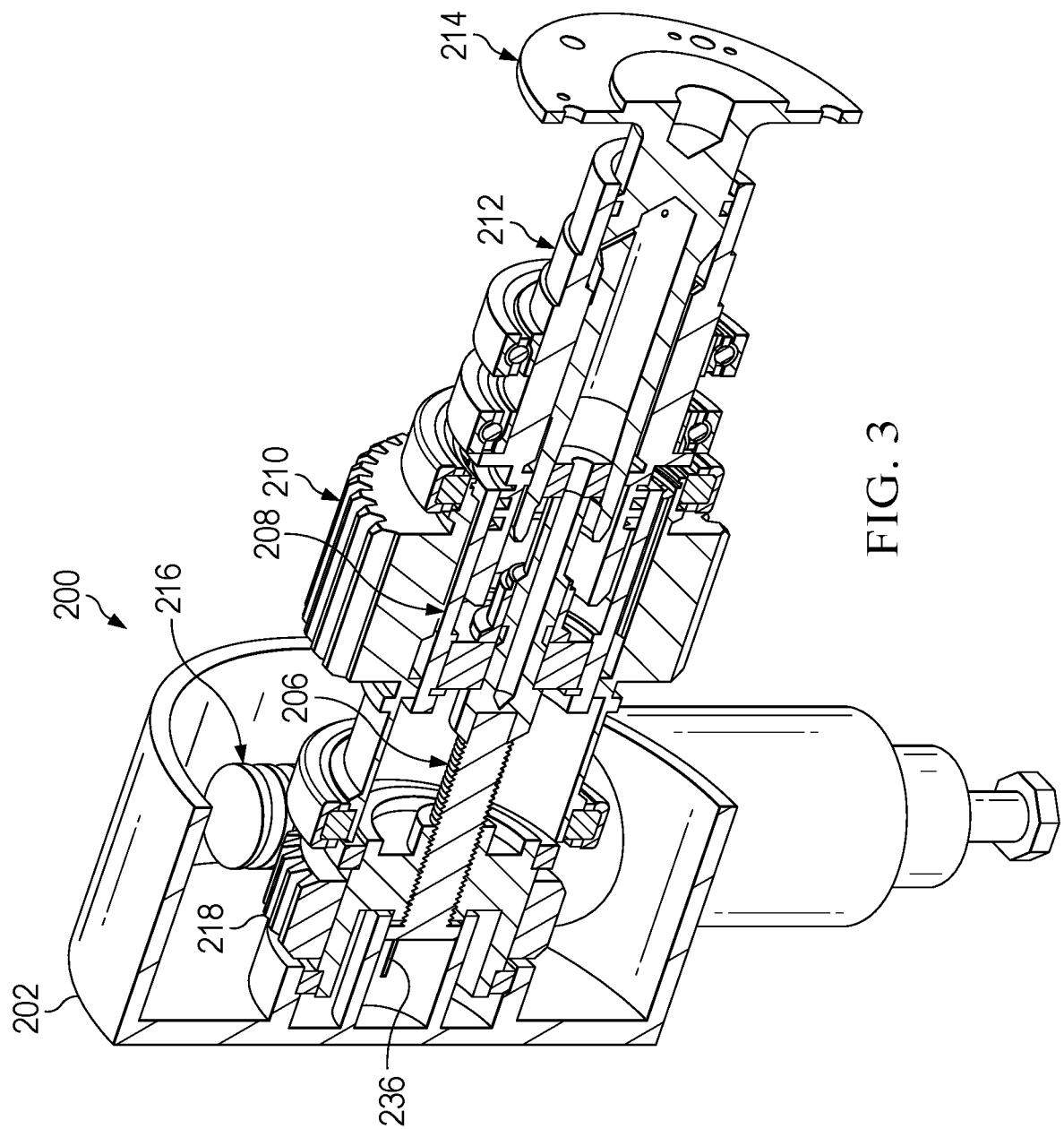
FIG. 3 is an illustration of a sectional view of a gearbox decoupling apparatus in a first position in accordance with an illustrative example.
Figure 4:
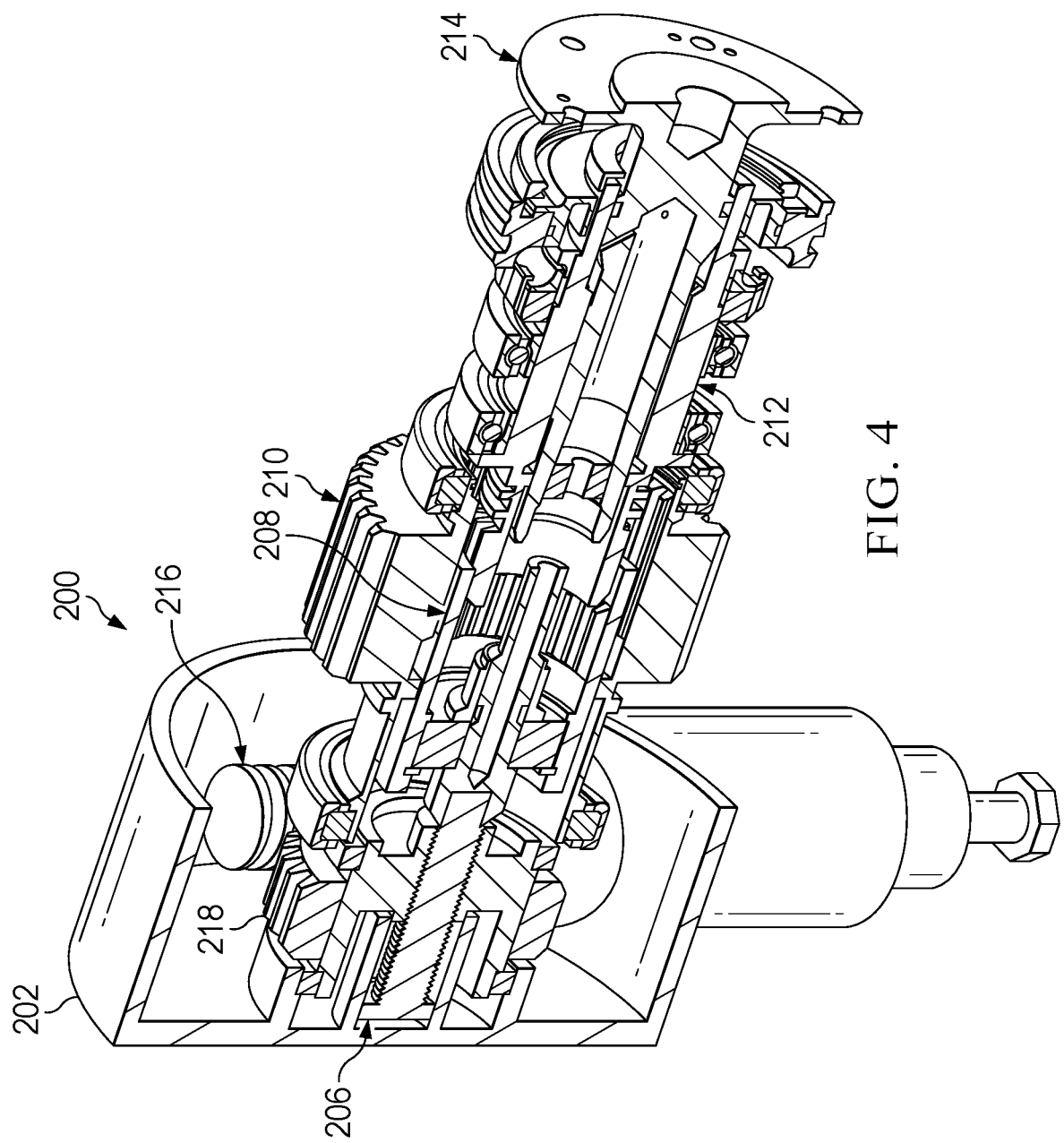
FIG. 4 is an illustration of a sectional view of a gearbox decoupling apparatus in a second position in accordance with an illustrative example.

With reference next to FIGS. 2-4, illustrations of a gearbox decoupling apparatus are depicted in accordance with an illustrative example. In this illustrative example and the illustrative examples that follow, the same reference numeral may be used in more than one figure. This reuse of a reference numeral in different figures represents the same element in the different figures. The components illustrated in FIGS. 2-4 are examples of physical implementations of housing 130, threaded rod 132, decoupling adapter 134, power take-off gear 122, power take-off adapter 124, and splined adapter 126 shown in block form in FIG. 1.

As illustrated, accessory gearbox decoupling system 200 includes housing 202, worm gear mechanism 204, threaded rod 206, decoupling adapter 208, power take-off gear 210, power take-off adapter 212 and spline adapter 214.

Power take-off gear 210 is mechanically engaged with an external gear train (not shown) and an external power source (not shown) via the external gear train.

Worm gear mechanism 204 is mounted within housing 202. Worm gear mechanism 204 includes input worm pinion 216 and worm gear wheel 218. Input worm pinion 216 includes threads 220. Threads 220 of input worm pinion 216 threadedly engage external threads 222 of worm gear wheel 218. Input worm pinion 216 further includes bolt head 224. Bolt head 224 is shaped to engage a torque producing implement to provide rotational movement of input worm pinion 216 about central longitudinal axis 226. Worm gear wheel 218 rotates about axis 228 and includes internal threads 230 for engagement with threaded rod 206.

Rotation of input worm pinion 216 about axis 226 causes rotation of worm gear wheel 218 about axis 228.

Threaded rod 206 includes threaded section 232 connected to puller shaft 234. Threaded section 232 is threadedly engaged with internal threads 230 of worm gear wheel 218. A tab of threaded rod 206 is sized and shaped to slidingly engage slot 236 formed in housing 202. Rotation of input worm pinion 216 about axis 226 causes rotation of worm gear wheel 218 about axis 228 which in turn causes linear movement of threaded rod 206 in direction 240 along axis 228 while the tab engaged with slot 236 prevents rotation of threaded rod 206 about axis 228.

Decoupling adapter 208 includes internal spline 242 and external spline 244. Decoupling adapter 208 is connected to puller shaft 234. Thus, linear movement of threaded rod 206 in direction 240 causes linear movement of decoupling adapter 208 also in direction 240. Decoupling adapter 208 moves between a first position (illustrated in FIG. 3) and a second position (illustrated in FIG. 4). Rotation of input worm pinion 216 about axis 226 ultimately affects linear movement of decoupling adapter 208 in direction 240 between a first position and a second position.

Power take-off gear 210 includes internal spline 250 and gear teeth 252. Power take-off gear 210 is permanently engaged with decoupling adapter 208. External spline 244 of decoupling adapter 208 is permanently engaged with internal spline 250 of power take-off gear 210. Decoupling adapter 208 can move in direction 240 with respect to power take-off gear 210. Whether decoupling adapter 208 is in the first position or the second position, decoupling adapter 208 is engaged with power take-off gear 210. Power take-off gear 210 mechanically engages an external gear train (not shown) via gear teeth 252.

Power take-off adapter 212 includes internal spline 254 and external spline 256. External spline 256 is engageable with internal spline 242 of decoupling adapter 208. Power take-off adapter 212 is permanently engaged with spline adapter 214 via internal spline 254 and external spline 260 of spline adapter 214. Spline adapter 214 is connected to an engine (not shown).

When decoupling adapter 208 is in the first position, internal spline 242 of decoupling adapter 208 is engaged with external spline 256 of power take-off adapter 212. When decoupling adapter 208 is in the second position, internal spline 242 of decoupling adapter 208 is disengaged from external spline 256 of power take-off adapter 212.

As a result, when decoupling adapter 208 is in the first position, decoupling adapter 208 is mechanically engaged with power take-off gear 210 and power take-off adapter 212. When decoupling adapter 208 is in the second position, decoupling adapter 208 is mechanically engaged with power take-off gear 210 and mechanically disengaged from power take-off adapter 212 such that external spline 256 of power take-off adapter 212 is not engaged with internal spline 242 of decoupling adapter 208.

The illustrative examples provide accessory gearbox decoupling system 200 for powering an accessory system with external power source without using a main engine while still allowing for the external power source to also be used to start the main engine.

Figure 5:
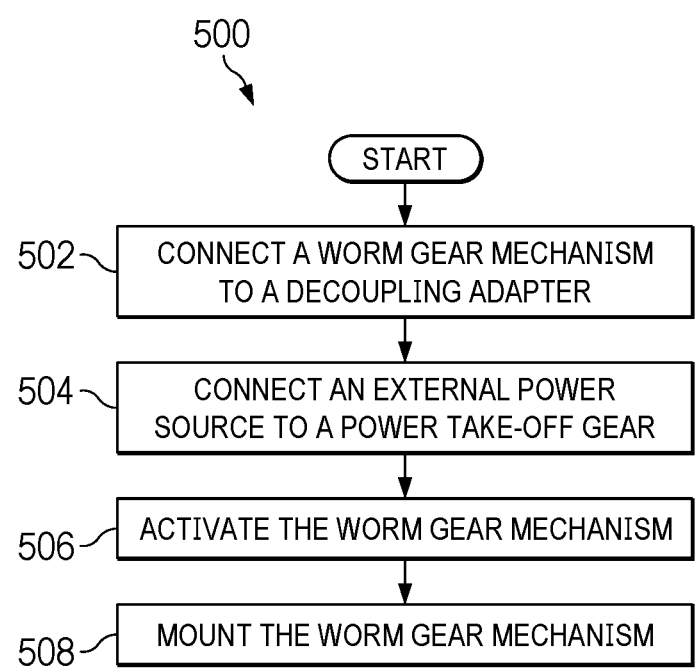
FIG. 5 of a flowchart of a process for powering an accessory system in accordance with an illustrative example.

With reference next to FIG. 5, an illustration of a flowchart of a process 500 for powering an accessory system is depicted in accordance with an illustrative example. The method depicted in FIG. 5 may be used in conjunction with the gearbox decoupling apparatus depicted in FIGS. 1-4.

The process begins by connecting a worm gear mechanism to a decoupling adapter (operation 502). The worm gear mechanism can be mounted in a space restricted area of an aircraft. Because the illustrated examples of the system for decoupling an accessory gearbox of an engine utilize minimal linear movement, the apparatus can be mounted in smaller spaces within the aircraft and save space for other systems. The process connects an external power source to a power take-off gear (operation 504). The external power source may be a typical ground cart often used to start an aircraft's engines. The power take-off gear is a mechanical connection between the external power source and the aircraft's engines. The power take-off gear also mechanically connects the external power source to an accessory system of the aircraft. At operation 506, the process activates the worm gear. Activating the worm gear causes the decoupling adapter to linearly move between a first position and a second position. Activating the worm gear comprises rotating an input worm pinion threadedly engaged with a worm gear wheel. The worm gear wheel is threadedly engaged with a threaded rod that is connected to the decoupling adapter. When the decoupling adapter is in the first position, the decoupling adapter is mechanically engaged with the accessory system and the engine. When the decoupling adapter is in the second position, the decoupling adapter is mechanically engaged with the accessory system and disengaged from the engine such that the accessory system is powered by the external power source without using the engine. At operation 508, the worm gear mechanism may be mounted to the aircraft that is operating the accessory system.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
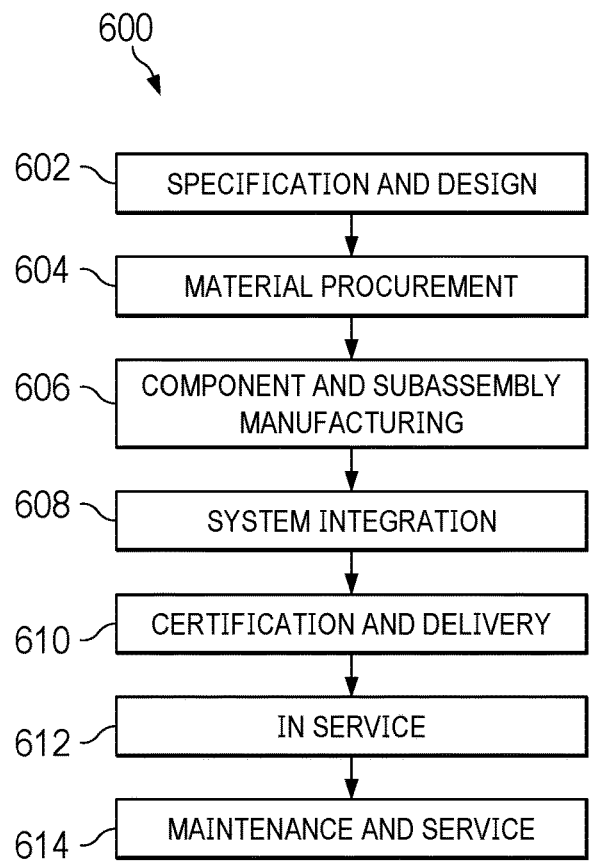
FIG. 6 is an illustration of a block diagram of an aircraft manufacturing and service method in accordance with an illustrative example.
Figure 7:
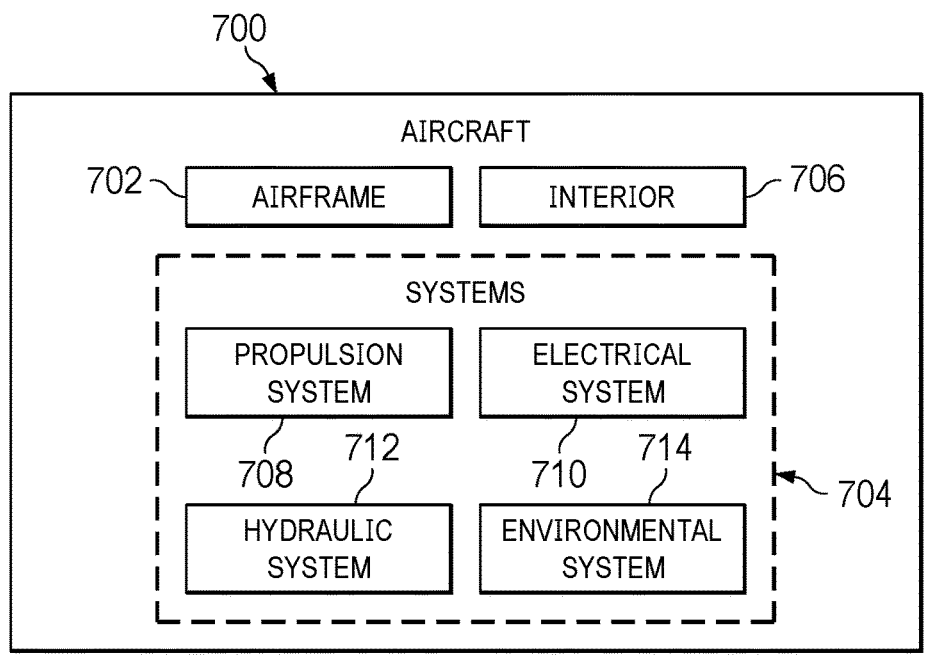
FIG. 7 is an illustration of a block diagram of an aircraft in which an illustrative example may be implemented.

The illustrative embodiments of the disclosure may be further described in the context of aircraft manufacturing and service method 600 as shown in FIG. 6 and aircraft 700 as shown in FIG. 7. Turning first to FIG. 6, an illustration of a block diagram of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance, service, or inspection.

Accessory gearbox decoupling system 106 may be installed on an aircraft during component and subassembly manufacturing 606. In addition, accessory gearbox decoupling system 106 may be retrofitted onto aircraft 700 in FIG. 7 during routine maintenance and service 614 as part of a modification, reconfiguration, or refurbishment of aircraft 700 in FIG. 7.

Each of the processes of aircraft manufacturing and service method 600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 7, an illustration of a block diagram of an aircraft is depicted in which an illustrative embodiment may be implemented. In this example, aircraft 700 is produced by aircraft manufacturing and service method 600 in FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6. In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while aircraft 700 is in service 612, during maintenance and service 614, inclusive of inspection, in FIG. 6, or both. The use of a number of the different illustrative embodiments may substantially expedite the assembly of aircraft 700, reduce the cost of aircraft 700, or both expedite the assembly of aircraft 700 and reduce the cost of aircraft 700.

The illustrative examples allow the powering and operation of accessories (generators, hydraulic pumps, etc.) in an independent accessory gearbox on an aircraft without powering the aircraft engine and requiring it to idle. This saves on engine operating time and potential wear. It also increases safety of the overall system by operating subsystems without operating/idling the engine which reduces fuel consumption and reduces noise.

The illustrative examples is a cost savings over currently employed operations because it allows operation of hydraulic and electrical subsystems without firing the aircraft engines, burning fuel, and wearing aircraft engine components.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A gearbox decoupling apparatus, that comprises:
   a worm gear mechanism;
   a threaded rod threadedly engaged with the worm gear mechanism; and
   a decoupling adapter connected to the threaded rod, wherein the decoupling adapter comprises:
      a first position and a second position;
      an internal spline configured to engage a power take-off adapter when the decoupling adapter is in the first position and disengage from the power take-off adapter when the decoupling adapter is in the second position; and
      an external spline permanently engaged with a power take-off gear.

2. The gearbox decoupling apparatus of claim 1, wherein the worm gear mechanism comprises:
   an input worm pinion; and
   a worm gear wheel threadedly engaged with the input worm pinion;
   wherein rotation of the input worm pinion imparts movement of the decoupling adapter between the first position and the second position.

3. The gearbox decoupling apparatus of claim 2, wherein the worm gear wheel comprises:
   internal threads engaged with the threaded rod; and
   external threads engaged with the input worm pinion.

4. The gearbox decoupling apparatus of claim 2, wherein the threaded rod comprises:
   a threaded section engaged with the worm gear wheel; and
   a puller shaft section connected to the decoupling adapter.

5. The gearbox decoupling apparatus of claim 2, wherein a rotation of the input worm pinion imparts linear movement of the threaded rod and the decoupling adapter relative to the power take-off gear and the power take-off adapter.

6. The gearbox decoupling apparatus of claim 1, wherein the power take-off gear comprises external gear teeth for engagement with an external gear train, the external gear train connected to a power source.

7. The gearbox decoupling apparatus of claim 6, when the decoupling adapter is in the first position, the power source is mechanically connected to the external gear train and an engine.

8. The gearbox decoupling apparatus of claim 1, wherein the power take-off gear comprises the internal spline permanently engaged with the decoupling adapter.

9. The gearbox decoupling apparatus of claim 1, wherein the worm gear mechanism comprises an input worm pinion and the input worm pinion comprises a bolt head.

10. A system for decoupling an accessory gearbox of an engine, comprising:
    a worm gear mechanism;
    a threaded rod engaged with the worm gear mechanism;
    a decoupling adapter connected to the threaded rod, the decoupling adapter movable between a first position and a second position;
    a power take-off gear permanently engaged with the decoupling adapter, the power take-off gear mechanically connected to an accessory system and an external power source; and
    a power take-off adapter mechanically connected to the decoupling adapter in the first position, wherein movement of the decoupling adapter between the first and second positions allows for the accessory system to be powered by the external power source without use of the engine.

11. The system of claim 10, wherein the worm gear mechanism comprises an input worm pinion.

12. The system of claim 11, wherein the worm gear mechanism comprises a worm gear wheel threadedly engaged with the input worm pinion, wherein rotation of the input worm pinion imparts a movement of the decoupling adapter between the first position and the second position.

13. The system of claim 12, wherein the input worm pinion comprises a bolt head.

14. The system of claim 12, wherein the worm gear wheel comprises:
    internal threads engaged with the threaded rod; and
    external threads engaged with the input worm pinion.

15. The system of claim 12, wherein the threaded rod comprises:
    a threaded section engaged with the worm gear wheel; and
    a puller shaft section connected to the decoupling adapter.

16. The system of claim 12, wherein a rotation of the input worm pinion imparts linear movement of the decoupling adapter relative to the power take-off adapter.

17. A method for powering an accessory system, the method comprising:
    connecting a worm gear mechanism to a decoupling adapter;
    connecting an external power source to a power take-off gear, the power take-off gear permanently engaged with the decoupling adapter; and
    activating the worm gear mechanism such that the decoupling adapter moves between a first position and a second position, when the decoupling adapter is in the first position, the decoupling adapter is mechanically engaged with the accessory system and an engine and when the decoupling adapter is in the second position, the decoupling adapter is mechanically engaged with the accessory system and disengaged from the engine such that the accessory system is powered by the external power source without using the engine.

18. The method of claim 17, wherein activating the worm gear mechanism comprises rotating an input worm pinion threadedly engaged with a worm gear wheel, the worm gear wheel threadedly engaged with a threaded rod connected to the decoupling adapter.

19. The method of claim 18, wherein rotating the input worm pinion comprises supplying torque to a bolt head of the input worm pinion or supplying torque to the input worm pinion directly from the external power source.

20. The method of claim 17, wherein the accessory system is an aircraft accessory system, the method further comprising:

mounting the worm gear mechanism within an aircraft operating the aircraft accessory system.

* * * * *

UNITED STATES PATENT AND TRADEMARK OFFICE
CERTIFICATE OF CORRECTION

PATENT NO. : 12,270,440 B1
APPLICATION NO. : 18/416754
DATED : April 8, 2025
INVENTOR(S) : Todd T. Harder, Yiyi Zhang and Mark Joseph Robuck Page 1 of 1

It is certified that error appears in the above-identified patent and that said Letters Patent is hereby corrected as shown below:

In the Claims

Column 10, Line 5, correct "claim 6, when" to read -- claim 6, wherein when --
Column 10, Line 62, correct "position, when" to read -- position, wherein when --
Column 10, Line 65, correct "when the decoupling adapter is in the second position" to read
-- wherein when the decoupling adapter is in the second position --

Signed and Sealed this
Third Day of June, 2025

Coke Morgan Stewart
*Acting Director of the United States Patent and Trademark Office*